United States Patent [19]
Dezelan

[11] 4,354,351
[45] Oct. 19, 1982

[54] LOAD SENSING STEERING

[75] Inventor: Joseph E. Dezelan, Western Springs, Ill.

[73] Assignee: Caterpillar Tractor Co., Peoria, Ill.

[21] Appl. No.: 250,754

[22] PCT Filed: Sep. 29, 1980

[86] PCT No.: PCT/US80/01291
§ 371 Date: Sep. 29, 1980
§ 102(e) Date: Sep. 29, 1980

[87] PCT Pub. No.: WO82/01226
PCT Pub. Date: Apr. 15, 1982

[51] Int. Cl.³ .......................................... F15B 13/04
[52] U.S. Cl. ..................................... 60/456; 60/464; 91/419; 91/431; 91/438; 91/464; 180/132
[58] Field of Search ............... 60/456, 464; 91/33, 91/419, 431, 438, 439, 464, 55; 180/132

[56] References Cited
U.S. PATENT DOCUMENTS

| | | | |
|---|---|---|---|
| 2,688,313 | 9/1954 | Bauer | 91/431 |
| 2,742,878 | 4/1956 | Glenny et al. | 91/431 X |
| 3,401,605 | 9/1968 | Born | 91/419 |
| 3,865,514 | 2/1975 | Lonnemo | 60/452 |
| 4,043,419 | 8/1977 | Larson et al. | 60/450 X |
| 4,059,042 | 11/1977 | Bridwell et al. | 91/469 |
| 4,179,981 | 12/1979 | Yedu | 91/33 |

Primary Examiner—Gerald A. Michalsky
Attorney, Agent, or Firm—Phillips, Moore, Weissenberger, Lempio & Majestic

[57] ABSTRACT

Fluid in the relatively long lines (22, 24) between a control valve (16) and a fluid actuator (14) can become overly viscous in cold weather. Herein, fluid is circulated through such lines (22, 24), at least during cold weather, even when the fluid actuator (14) is not being used. This flowing is discontinued in response to shifting of the control valve (16) to a position where it motivates the actuator (14) and in response to pressure in the circulating path (20) exceeding a selected level.

5 Claims, 6 Drawing Figures

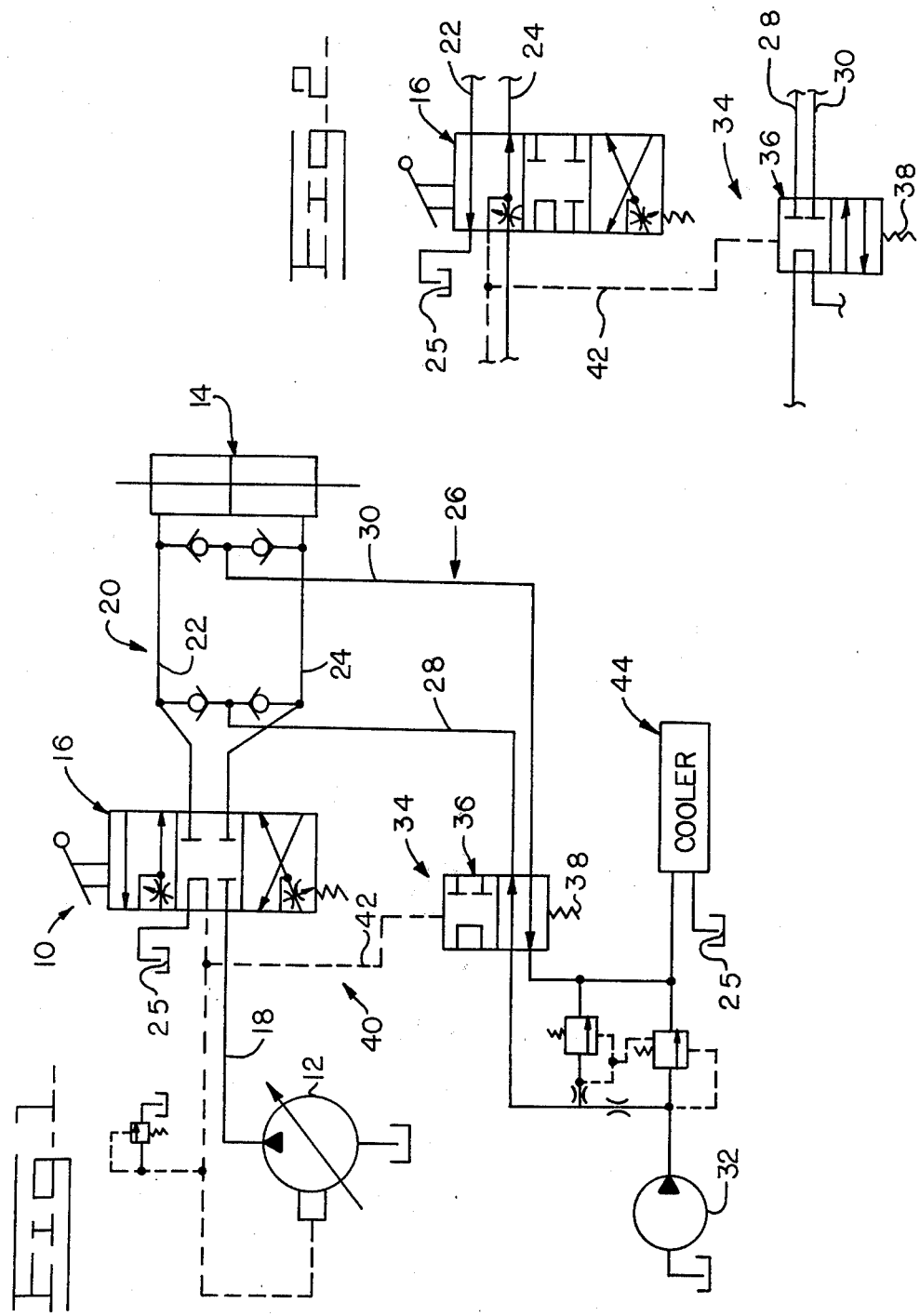

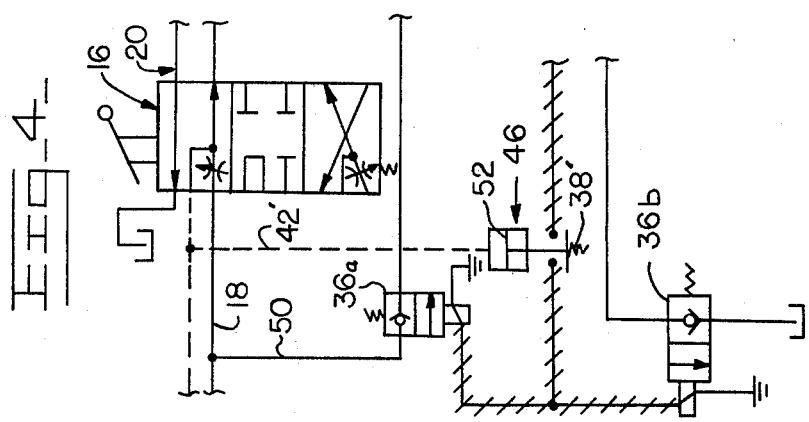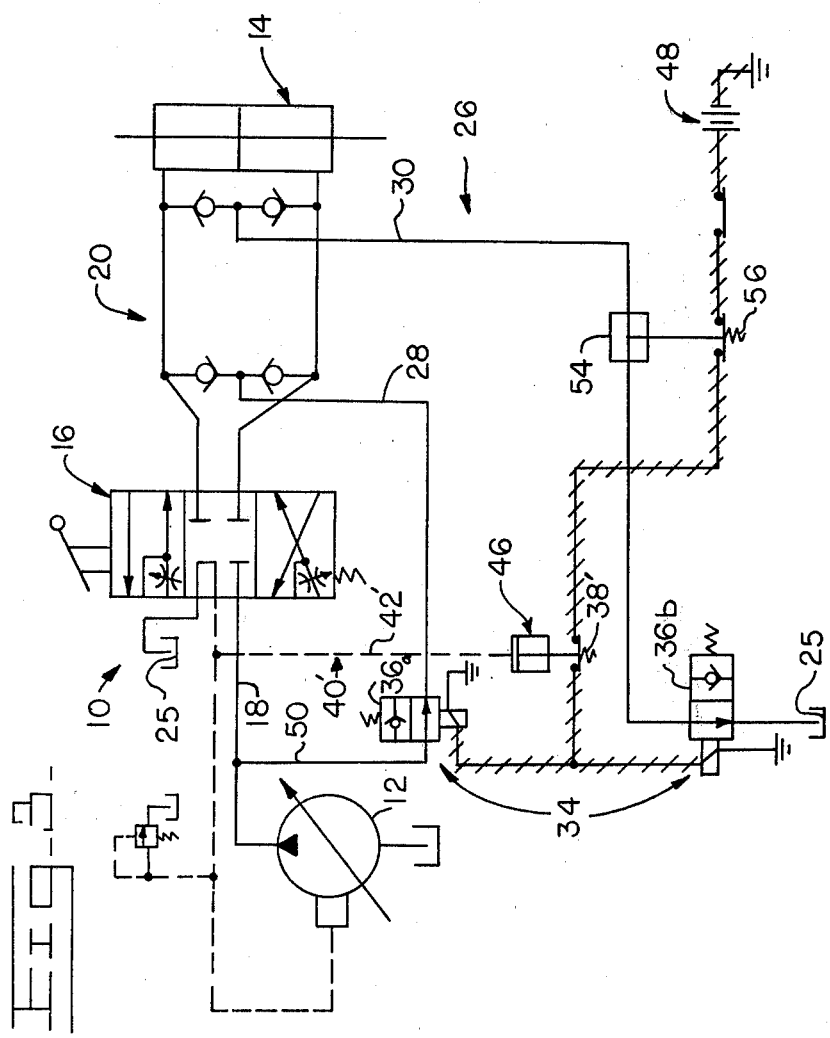

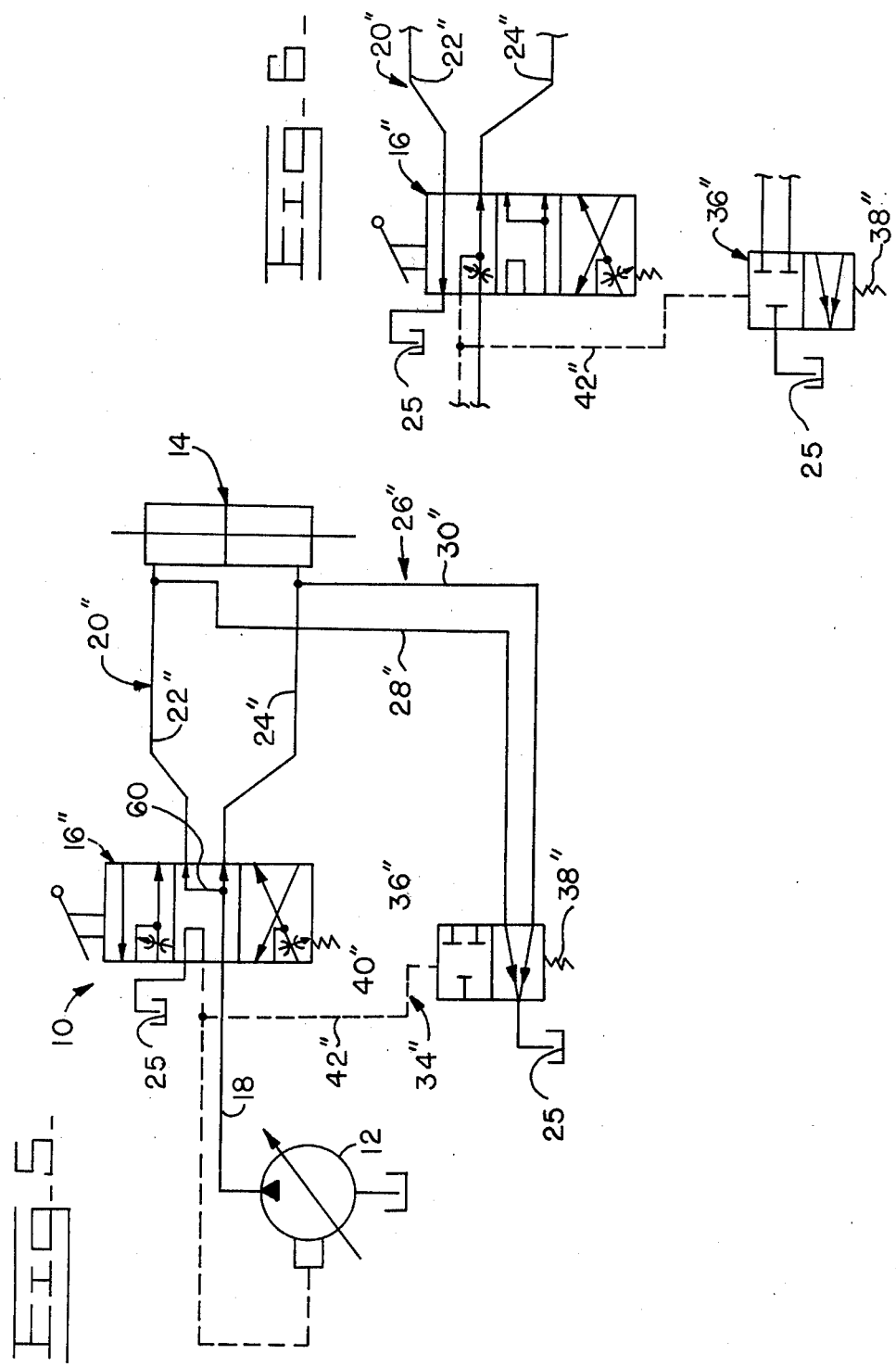

LOAD SENSING STEERING

DESCRIPTION

1. Technical Field

This invention relates generally to a fluid circuit and more particularly to a steering circuit having continuous flow therethrough to keep the oil in the lines warm in cold weather conditions.

2. Background Art

In the use of vehicles in extremely cold environments, as for example when the vehicles are used in Alaska during the winter, the hydraulic fluid in a steering circuit or in other circuits may increase in viscosity to a magnitude sufficient to make the system slow to respond. One particular location at which the hydraulic fluid can easily become excessively viscous is in the relatively long conduits which provide the fluid pathway between the steering control valve and the hydraulic cylinder which actuates the steering mechanism. During extended operation without utilizing the steering function, the fluid in these long conduits can cool to a value at which the pump pressure is slow to move the viscous fluid in the conduit upon actuation of the steering valve.

One useful circuit for solving such a problem is disclosed in U.S. Pat. No. 4,059,042 issued Nov. 22, 1977 to J. W. Bridwell and George H. Miner III. This patent sets up a circuit wherein fluid is trickled through the hydraulic lines connecting the brake or clutch control valve with its respective hydraulic actuator when that actuator is not being powered in one direction or another. The circuit is not, however, in any way sensitive to the actual work condition of the hydraulic actuator, i.e., to whether or not the hydraulic actuator is, in reality, acting against a load. Instead, actuation is responsive to physical movement of the clutch or brake pedal which serves to mechanically push a control valve into a position to deactivate the trickle flow through the long lines when the brake or clutch is activated, and to reactivate the trickle flow when the brake or clutch is deactivated. Such mechanical parts can conceivably hang up, due to friction, wear, or the like, in incorrect positions, thus causing undesirable deactuation of the trickle flow when such is desirable.

The present invention is directed to overcoming one or more of the problems as set forth above.

DISCLOSURE OF THE INVENTION

In one aspect of the present invention, an improvement is provided in a fluid circuit having a pressurized fluid source, a fluid actuator and a directional control valve selectively positionable in first (closed) and second (open) positions and being connected to receive pressurized fluid from the source. The circuit includes circulating means for circulating fluid from the valve to the actuator in response to positioning of the valve in the second position and flowing means for flowing pressurized fluid into and from the circulating means. The improvement comprises logic means for preventing operation of the flowing means in response to positioning of the valve in the second position and to the pressure of the fluid in the circulating means exceeding a selected level.

An improved circuit as set out above has the advantage that it is automatically actuated in response to load sensed by the circuit and is not dependent upon positioning of a lever or other mechanical member, but only positioning of the control valve. Flow is provided through the long hydraulic lines which connect the control valve with a fluid actuator ensuring that the fluid passing through such lines is kept warm in cold weather conditions. In accordance with one preferred embodiment of the invention, flow through the lines connecting the control valve to the actuator can be terminated when the fluid temperature is sufficiently high. In another embodiment, means can be provided for cooling the fluid which is flowing through the hydraulic lines which connect the control valve to the fluid actuator during warm weather, thus allowing a relatively viscous oil, such as SAE-10 hydraulic oil, to be utilized on an all year round basis without the need to dilute with additives.

BRIEF DESCRIPTION OF THE DRAWINGS

FIG. 1 illustrates, schematically, one embodiment of the present invention;

FIG. 2 illustrates, schematically, a portion of the embodiment of FIG. 1 in an alternate mode of actuation;

FIG. 3 illustrates, schematically, a second embodiment of the present invention;

FIG. 4 illustrates, schematically, the embodiment of FIG. 3 in an alternate mode of actuation;

FIG. 5 illustrates, schematically, a third embodiment of the present invention; and FIG. 6 illustrates, schematically, a portion of the embodiment of FIG. 5 in an alternate mode of actuation.

BEST MODE FOR CARRYING OUT THE INVENTION

Embodiment of FIGS. 1 and 2

FIG. 1 shows a fluid circuit 10 having a pressurized fluid source of pump 12 which supplies fluid to a fluid actuator 14 which may be a double acting hydraulic cylinder of a vehicle steering system. A directional control valve 16 is connected to receive pressurized fluid from the pump 12 as via a conduit 18. The valve 16 might typically be a directional control steering valve. Circulating means 20, in the embodiment illustrated, a pair of conduits 22 and 24, serves for circulating fluid from the valve 16 to the actuator 14 in response to the positioning of the valve 16 in a selected one of first and second positions thereof. FIG. 1 shows the valve in its first or blocked position. FIG. 2 shows the valve in its second position wherein fluid flows inwardly via conduit 24 and outwardly via conduit 22 to a sump 25. The particular valve 16 illustrated also has a third position, shifted upwardly from the position shown in FIG. 1, wherein flow is inwardly via conduit 22 and outwardly via conduit 24 and wherein the fluid actuator 14 is motivated in an opposite direction from that in which it is actuated with the valve 16 positioned as shown in FIG. 2. Flowing means 26, seen in FIG. 1, serves for flowing pressurized fluid into the circulating means 20 and for flowing that pressurized fluid away from the circulating means 20. The particular flowing means 26 shown includes first flowing means 28 for delivering fluid to the circulating means 20 and second flowing means 30 for removing fluid from the circulating means 20. A cooler bypass pump 32 or equivalent means serves for supplying pressurized fluid to the first flowing means 28.

In accordance with the present invention, logic means 34 serves for preventing operation of the flowing means 26 in response to positioning of the control valve 16 in its second position (as shown in FIG. 1) and to the pressure of the fluid in the circulating means 20 exceeding a selected level. The preferred logic means 34 includes a blocking valve 36 having an open position (as shown in FIG. 1) and a blocked position (as shown in FIG. 2). The logic means 20 also includes biasing means 38, in the embodiment illustrated a spring, which serves for normally biasing the blocking valve 36 into its open position. Further, the logic means 20 includes means 40, in the embodiment illustrated a conduit 42, for delivering a signal, determined by the pressure of the fluid in the circulating means 20, in opposition to the biasing means 38, in response to positioning of the control valve 16 in its second position. When the pressure in the circulating means 20 exceeds a selected value, the pressure in the conduit 42 is sufficient to propel the blocking valve 36 to its blocked position as shown in FIG. 2.

It will be noted that cooling means 44 may be provided for cooling the fluid in the flowing means 26. The cooling means 44 is particularly useful when the apparatus is used during warm weather since it will allow relatively viscous hydraulic fluid, for example, SAE-10 hydraulic oil, to be utilized in warm weather. This allows the same fluid to be utilized in both warm weather and cool weather.

Embodiment of FIGS. 3 and 4

FIGS. 3 and 4 illustrates an embodiment of the present invention wherein certain of the hydraulically actuated elements of the embodiment of FIGS. 1 and 2 have been replaced by electrically actuated components.

The embodiment of FIG. 3 replaces the blocking valve 36 of FIGS. 1 and 2 with a first solenoid actuated valve 36a and a second solenoid actuated valve 36b. These two solenoid actuated valves together comprise blocking valve means 34' of the embodiment of FIGS. 3 and 4. FIG. 3 shows the valves 36a and 36b in their first or open position and FIG. 4 shows these valves in their second or blocked positions.

With the control valve 16 in the position shown in FIG. 3, a pressure switch 46 is positioned to close a circuit from a battery 48 through the solenoids which actuate each of the valves 36a and 36b to ground. Flow then proceeds from the pump 12 (rather than from a cooler bypass pump 32 as in FIGS. 1 and 2) via a conduit 50, through first solenoid actuated valve 36a, into first flowing means 28', through circulating means 20, out of second flowing means 30' and through valve 36b to the sump 25.

When the control valve 16 is shifted to the position shown in FIG. 4, the load pressure in the circulating means 20, or rather a signal determined thereby, is delivered via a conduit 42' in a manner whereby it overcomes the biasing of biasing means 38' of pressure switch 46, thereby causing pressure switch 46 to open. In the particular embodiment illustrated, conduit 42' delivers pressurized fluid which forces a piston 52 downwardly, whereby the contacts of the pressure switch 46, which are attached to the piston 52, are likewise carried downwardly and out of contact with the electrical lines which serve to actuate the solenoids of the valves 36a and 36b.

Adverting once again to FIG. 3, it should be noted that a temperature actuated switch 54 also forms a part of this embodiment of the invention. The switch 54 is normally biased, as by biasing means 56, to complete the circuit between the battery 48 and ground via the solenoids of the valves 36a and 36b. When the temperature sensed in the flowing means 26' is sufficiently high, the switch 54 breaks the circuit between the battery and ground, thereby cutting off power to the solenoids of the valves 36a and 36b. In that situation, the valves 36a and 36b assume the position shown in FIG. 4, irrespective of the setting of the control valve 16. This assures that in warm weather, fluid will not be constantly circulated through the circulating means 20. This serves to conserve hydraulic fluid that would otherwise be passed from the system to tank for no added benefit.

Embodiment of FIGS. 5 and 6

The embodiment of FIGS. 5 and 6 is useful in systems which employ an open centered valve 16" rather than a closed centered valve 16 as shown in FIGS. 1–4. When the valve 16" is in its first or centered position as shown in FIG. 5, flow proceeds from the conduit 18 through the valve 16" and through the circulating means 20", which includes a conduit 22" and a conduit 24" (as illustrated in FIGS. 5 and 6), and flow continues through first flowing means 28" and second flowing means 30", and through a blocking valve 36" to the sump 25.

When the valve 16" is shifted to the position shown in FIG. 6, flow proceeds inwardly via the conduit 24" and outwardly via the conduit 22" to the sump 25. It will be noted that a conduit 42" then delivers a signal which is determined by the pressure level in the circulating means 20" in opposition to the force of biasing means 38" to force the blocking valve 36" into its blocked position.

Industrial Applicability

The invention as set out above is particularly useful when the directional control valve 16 or 16" is a steering valve and wherein the fluid actuator 14 is the steering motor of a vehicle such as a wheel tractor.

Operationally, the system provides circulation of fluid through the circulating means 20, which normally consists of relatively long conduits 22 and 24, connecting the control valve 16 to the fluid actuator 14. This is particularly important in cold weather and serves to prevent the viscosity of the fluid from getting too great within these conduits thus providing good system response. In accordance with the embodiment of FIGS. 1 and 2, cooling means 44 can be utilized to keep the fluid relatively cool in warm weather whereby a single relatively low weight fluid can be utilized throughout the year. In accordance with the embodiment of FIGS. 3 and 4, the system can be electrically actuated rather than actuated by hydraulic fluid. Also in accordance with the embodiment of FIGS. 3 and 4, a thermosensitive switch 54, or the like, can be included to stop circulation through the circulating means 20 when the temperature of the fluid therein, and in flowing means 26', is above a selected temperature. In accordance with the embodiment of FIGS. 5 and 6, the present invention is useful with open centered control valve 16" as well as with the closed centered control valve 16 shown in the embodiments of FIGS. 1–4.

Other aspects, objects and advantages of this invention can be obtained from a study of the drawings, disclosure and the appended claims.

I claim:

1. In a fluid circuit (10) having a pressurized fluid source (12); a fluid actuator (14); a directional control valve (16 or 16") selectively positionable in first and second positions, and being connected to receive pressurized fluid from said source (12); fluid directing means (20 or 20") for directing fluid from the valve (16 or 16") to the actuator (14) in response to positioning of the control valve (16 or 16") in said second position; and flowing means (26,26' or 26") for flowing pressurized fluid into and for venting that fluid from said fluid directing means (20 or 20"); the improvement comprising:

logic means (34,34' or 34") for preventing operation of said flowing means (26,26' or 26") in response to both (a) positioning of said valve (16) in said second position and (b) the pressure of the fluid in said fluid directing means (20 or 20") exceeding a preselected magnitude.

2. The circuit (10) as set forth in claim 1, further including:

means (32, 50 or 60) for supplying pressurized fluid to said flowing means (26,26' or 26");

wherein said logic means (34) includes blocking valve (36,36a,36b or 36"), biasing means (38,38' or 38") for normally positioning said blocking valve (36, 36a, 36b, or 36") in said open position and means (40,40' or 40") for overcoming said biasing means (38,38' or 38") and positioning said blocking valve means (36,36a,36b or 36") in said closed position in response to positioning of said control valve (16,16") in said second position and to the pressure in the fluid directing means (20 or 20") exceeding said preselected magnitude; and wherein said flowing means (26,26' or 26") includes first flowing means (28,28' or 28") for delivering fluid to said fluid directing means (20 or 20") and second flowing means (30,30' or 30") for removing fluid from said fluid directing means (20 or 20").

3. The circuit (10) as set forth in claim 2, further including:

means (44) for cooling said fluid 20 flowed in said fluid directing means (20).

4. The circuit (10) as set forth in claim 1, further including:

temperature sensing means (54) for disabling said logic means (34, 34' or 34") in response to temperature of said fluid in said flowing means (26, 26' or 26") exceeding a selected value.

5. A steering circuit (10) comprising:

a pressurized fluid source (12);

a steering motor (14);

a directional control steering valve (16 or 16") selectively positionable between a first position at which fluid is blocked from communication with said steering motor (14) and a second position at which fluid is in communication with said steering motor (14) and being connected to receive pressurized fluid from said source (12);

fluid directing means (20 or 20") for directing fluid from said steering valve (16 or 16") to said steering motor (14);

flowing means (26,26' or 26") for flowing pressurized fluid into and for venting said fluid from said fluid directing means (20 or 20"); and logic means (34,34' or 34") for preventing operation of said flowing means (26,26' or 26") in response to both (a) positioning of said steering valve (16 or 16") in said second position and (b) the pressure of the fluid in said fluid directing means (20 or 20") exceeding a selected value.

* * * * *